(12) United States Patent
Sedrak

(10) Patent No.: US 12,411,809 B2
(45) Date of Patent: Sep. 9, 2025

(54) VIRTUAL FILE SYSTEM FOR TRANSACTIONAL DATA ACCESS AND MANAGEMENT

(71) Applicant: Google LLC, Mountain View, CA (US)

(72) Inventor: Fady Sedrak, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/218,307

(22) Filed: Jul. 5, 2023

(65) Prior Publication Data

US 2025/0013610 A1  Jan. 9, 2025

(51) Int. Cl.
| | | |
|---|---|---|
| G06F 16/17 | (2019.01) | |
| G06F 16/11 | (2019.01) | |
| G06F 16/14 | (2019.01) | |
| G06F 16/188 | (2019.01) | |

(52) U.S. Cl.
CPC ........ G06F 16/1734 (2019.01); G06F 16/128 (2019.01); G06F 16/148 (2019.01); G06F 16/188 (2019.01)

(58) Field of Classification Search
CPC .. G06F 16/1734; G06F 16/188; G06F 16/148; G06F 16/128
See application file for complete search history.

(56) References Cited

U.S. PATENT DOCUMENTS

| | | | |
|---|---|---|---|
| 9,514,154 B2 | 12/2016 | Garimella et al. | |
| 2016/0267105 A1* | 9/2016 | Sun | G06F 16/128 |
| 2020/0065401 A1* | 2/2020 | Sooraj | G06F 16/183 |
| 2020/0394625 A1* | 12/2020 | Piparsaniya | G06Q 20/36 |
| 2021/0232538 A1* | 7/2021 | Konduru | G06F 16/2282 |
| 2024/0126744 A1* | 4/2024 | Gupta | G06F 16/2379 |
| 2024/0296082 A1* | 9/2024 | Waller | G06F 9/547 |

OTHER PUBLICATIONS

Dipankar Mazumdar, "What Is a Data Lakehouse?", Sep. 27, 2023, pp. 1-12, [https://www.dremio.com/resources/guides/what-is-a-data-lakehouse/#h-data-lakehouse-advantages <https://www.dremio.com/resources/guides/what-is-a-data-lakehouse].
Dremio Architecture Guide, Sep. 27, 2023, pp. 1-17 [https://www.dremio.com/downloads/DremioArchitectureGuide.pdf].
"Apache Iceberg", Sep. 27, 2023, pp. 1-7, [https://docs.dremio.com/current/sonar/query-manage/data-formats/apache-iceberg].
Data Lakehouse (Glossary), Sep. 27, 2023, [https://www.databricks.com/glossary/data-lakehouse].
Ryan Boyd, "How Data Lakehouses Solve Common Issues With Data Warehouses", Feb. 4, 2021, pp. 1-7, [https://www.databricks.com/blog/2021/02/04/how-data-lakehouses-solve-common-issues-with-data-warehouses.html].

(Continued)

*Primary Examiner* — Courtney Harmon
(74) *Attorney, Agent, or Firm* — Lerner David LLP

(57) ABSTRACT

A data storage management method includes detecting a data change to data in a data repository, identifying metadata of the data change, and storing the metadata in a virtual file, the virtual file being in a data storage format that is compatible with one or more data analysis tools. In response to a subsequent user request to access metadata of the data in the data repository, the method may transmit one or more virtual files containing metadata identified in the user request.

15 Claims, 3 Drawing Sheets

(56) References Cited

OTHER PUBLICATIONS

Burak Yavuz, et al., "Diving Into Delta Lake: Unpacking The Transaction Log", Aug. 21, 2019, pp. 1-12, [https://www.databricks.com/blog/2019/08/21/diving-into-delta-lake-unpacking-the-transaction-log.html].

Tathagata Das and Brenner Heintz, "Diving Into Delta Lake: DML Internals (Update, Delete, Merge)", Sep. 29, 2020, pp. 1-11, [https://www.databricks.com/blog/2020/09/29/diving-into-delta-lake-dml-internals-update-delete-merge.html].

Ben Lorica, et al., "What Is a Lakehouse?", Jan. 30, 2020, pp. 1-7, [https://www.databricks.com/blog/2020/01/30/what-is-a-data-lakehouse.html?_ga=2.40391394.1157999582.1679834013-26a19054-e332-4e48-969a-fb07e4021f1f].

Kumar et al., "Separating Storage and Compute with the Databricks Lakehouse Platform", Mar. 29, 2023, 9th International Conference on Data Science and Advanced Analytics (DSAA).

International Search Report and Written Opinion for International Application No. PCT/US2024/035575 dated Sep. 4, 2024. 15 pages.

\* cited by examiner

VIRTUAL FILE SYSTEM FOR TRANSACTIONAL DATA ACCESS AND MANAGEMENT

BACKGROUND

A data lake is a repository of data stored in its natural or raw format, such as object blobs or files. In order to ensure the quality of the data contained in the data lake, data governance and data management routines are often implemented. However, it can be difficult to identify correct data sources, manage metadata, and ensure the security of the data contained in the data lake. These difficulties can hinder data maintenance and governance for the data stored in the data lake.

One way of managing the data is to collect a metadata snapshot for any change made to the data stored in the data lake, and then to export the metadata snapshot to a remote location such as a network-connected storage service. However, exporting the metadata snapshot occurs only after a user request or at regularly scheduled intervals. This poses a risk that the information in the storage service does not accurately reflect the information in the data for the time between when a change is made at the data lake and the metadata snapshot is exported. As a result, the exported metadata snapshot does not support several features that could otherwise be provided by a data warehouse, such as ACID (Atomicity, Consistency, Isolation, Durability) transactions, row-level security of the data, column-level security of the data, data versioning, and auditing.

SUMMARY

The present disclosure uses a virtual file system to pull the most up-to-date metadata from a metadata catalog associated with the data lake. This avoids the need to wait for exports of the metadata from the metadata catalog to the data lake and ensures that up-to-date metadata is returned in response to user requests.

In one aspect of the disclosure, a method includes: detecting, by one or more processors, a data change to data in a data repository; identifying, by the one or more processors, metadata of the data change; and storing, by the one or more processors, the metadata in a virtual file, the virtual file being in a data storage format that is compatible with one or more data analysis tools.

In some examples, the method may further include: receiving, by the one or more processors, a user request to access metadata of the data in the data repository; and in response to the user request, transmitting, by the one or more processors, one or more virtual files containing metadata identified in the user request.

In some examples, the data repository may be a data lake containing both structured data and unstructured data.

In some examples, the data storage format of the virtual file may be an open table format.

In some examples, the method may further include: generating, by the one or more processors a snapshot of the metadata of the data change; and storing the snapshot in a network-connected storage medium separate from the data repository, storing the snapshot occurring either in response to a user storage request or at regularly scheduled intervals.

In some examples, the data repository may include both structured data and unstructured data.

In some examples, the one or more data analysis tools may include at least one of a governance compliance tool, a data versioning tool, or a file listing caching tool.

In some examples, the method may further include storing, by the one or more processors, the virtual file in a data store containing a plurality of virtual files containing metadata from the data repository.

In some examples, the plurality of virtual files may include at least one virtual file in a row-based format and at least one virtual file in a column-based format, and the one or more data analysis tools may include at least one row-level security tool and at least one column-level security tool.

In some examples, the data change to data in the data repository may be an ACID transaction.

Another aspect of the present disclosure is directed to a system including one or more processors and memory having stored thereon instructions for causing the one or more processors to: detect a data change to data in a data repository; identify metadata of the data change; and store the metadata in a virtual file, the virtual file being in a data storage format that is compatible with one or more data analysis tools.

In some examples, the instructions may further cause the one or more processors to: receive a user request to access metadata of the data in the data repository; and in response to the user request, transmit one or more virtual files containing metadata identified in the user request.

In some examples, the memory may include a data lake containing both structured data and unstructured data in an open table format.

In some examples, the memory may further include a data warehouse containing metadata associated with the structured data and unstructured data contained in the data lake.

In some examples, the instructions may further cause the one or more processors to: generate a snapshot of the metadata contained in the data warehouse; and push the snapshot to storage in response to a user storage request or at regularly scheduled intervals.

In some examples, the instructions may further cause the one or more processors to: receive a user request to access metadata of the data in the data repository; in response to the user request, pull metadata contained in the data warehouse and associated with the user request from the data warehouse; and respond to the user request by transmitting one or more virtual files identifying the pulled metadata.

In some examples, the metadata pulled from the warehouse may be accessible via the user request prior to a snapshot of the metadata being generated.

In some examples, the one or more virtual files may include at least one virtual file in a row-based format and at least one virtual file in a column-based format, and the one or more data analysis tools may includes at least one row-level security tool and at least one column-level security tool.

In some examples, the one or more data analysis tools may include at least one of a governance compliance tool, a data versioning tool, or a file listing caching tool.

In some examples, the data change to data in the data repository may be an ACID transaction.

DETAILED DESCRIPTION

Overview

The present disclosure provides an improved architecture for managing data in data lakes while ensuring consistency between the collected metadata and the data actually contained in the data lake. This is accomplished by providing a virtual file system that provides users with access to metadata that reflects the up-to-date transactional state of the data stored in the data lake, without waiting for exports of the metadata.

In operation, a virtual file service acts as an intermediary between the data lake and the user. The virtual file service may receive updates or changes made to data in the data lake on demand, and in response, may generate a virtual file reflecting the change. The virtual file may be in a format that is compatible with one or more known data management tools, such as an open table format, enabling the user to easily review and maintain the data based on the indicated changes.

For at least some uses, the virtual files generated by the virtual file service may be in place of or in addition to the metadata snapshots that are conventionally stored. In other words, the virtual files may be used to ensure that the metadata snapshots are up to date and consistent with the data lake.

The system architecture and operations described herein provide a lakehouse structure having a virtual data warehouse layer built on top of the data lake, while also ensuring consistency between the data lake and the data warehouse layer. This, in turn, facilitates several features that are common for data warehouses but otherwise difficult to implement for data stored in a data lake, such as ACID (atomicity, consistency, isolation, durability) transactions, data versioning, auditing, indexing caching, fine-grain data security—including both row-based security and column-based security—and data governance.

Example Systems

Figure 1:
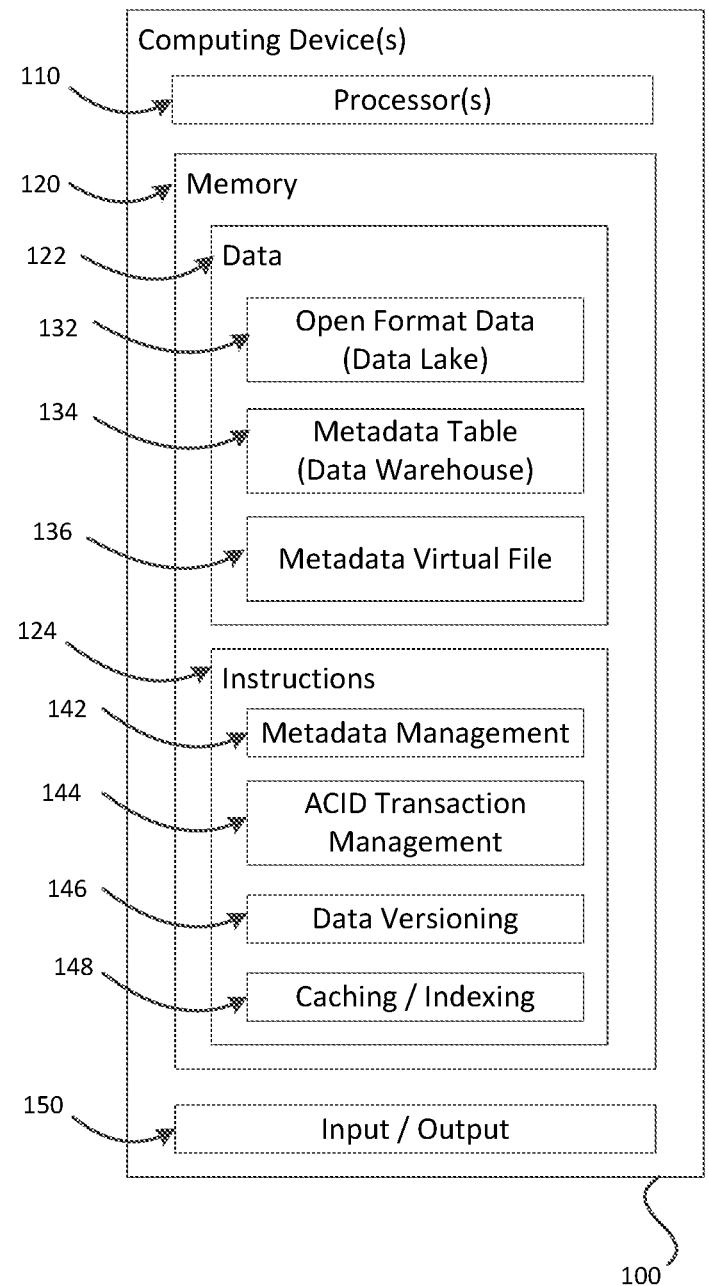
FIGS. 1 and 2 are block diagrams of example systems in accordance with an aspect of the present disclosure.

FIG. 1 is a block diagram illustrating an example system having one or more computing devices 100 configured to manage a data storage service. The computing devices 100 may comprise computing devices located at a customer location that make use of cloud computing services such as Infrastructure as a Service (IaaS), Platform as a Service (PaaS), and/or Software as a Service (SaaS). For example, if a computing device 100 is located at a business enterprise, computing device 100 may use cloud systems as a service that provides software applications, e.g., accounting, word processing, inventory tracking, etc., to computing devices used in operating enterprise systems. In addition, the computing devices 100 may access cloud computing systems as part of its operations that employ machine learning, deep learning, or more generally artificial intelligence technology, to train applications that support its business enterprise.

Cloud computing systems may comprise one or more data centers that may be linked via high speed communications or computing networks. A given data center within a system may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well as provide redundancy and maintain high availability. Similarly, different cloud computing systems are typically provided at different geographic locations.

For example, the one or more computing devices 100 may comprise a customer computer or server in a bank or credit card issuer that accumulates data relating to credit card use by its card holders and supplies the data to a cloud platform provider, who then processes that data to detect use patterns that may be used to update a fraud detection model or system, which may then be used to notify the card holder of suspicious or unusual activity with the card holder's credit card account. Other customers may include social media platform providers, government agencies or any other business that uses machine learning as part of its operations. The machine or deep learning processes, e.g., gradient descent, may provide model parameters that customers use to update the machine learning models used in operating their businesses.

As shown in FIG. 1, the one or more computing devices 100, may include one or more processors 110, memory 120 storing data 122 and instructions 124 that may be executed or otherwise used by the processors 110, and input/output system 150 which may be interconnected via a network (not shown). The one or more computing devices 100 may comprise a standalone computer (e.g., desktop or laptop) or a server. In the case of a standalone computer, the network may comprise data buses, etc., internal to a computer; in the case of a server, the network may comprise one or more of a local area network, virtual private network, wide area network, or other types of networks described below in relation to the network.

The one or more processors 110 may be any conventional processor, such as commercially available CPUs. Alternatively, the one or more processors may be a dedicated device such as an ASIC or other hardware-based processor. Although FIG. 1 functionally illustrates the processor, memory, and other elements of computing devices 100 as being within the same block, it will be understood by those of ordinary skill in the art that the processor, computing device, or memory may actually include multiple processors, computing devices, or memories that may or may not be located or stored within the same physical housing. In one example, one or more computing devices 100 may include one or more server computing devices having a plurality of computing devices, e.g., a load balanced server farm, that exchange information with different nodes of a network for the purpose of receiving, processing and transmitting the data to and from other computing devices as part of customer's business operation.

The memory 120 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 122 may be retrieved, stored or modified by processor 110 in accordance with the instructions 124. As an example, data 122 associated with memory 120 may include data contained in the data lake, such as open format data 132. The data 122 may further include data contained in a data warehouse, such as a metadata table 134. The metadata table 134 may include metadata about the data included in the data lake. Metadata included in the data warehouse may be useful for some forms of processing of the data contained in the data lake described herein. The data 122 may further include one or more metadata virtual files 136. The metadata virtual files 136 may provide an up-to-date account of the metadata contained in the warehouse, such as the metadata table 134.

The instructions 124 may be any set of instructions to be executed directly, such as machine code, or indirectly, such as scripts, by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. As an example, instructions 124 associated with the memory 120 may comprise metadata management operations 142, ACID transaction management operations 144, data versioning operations 146, data caching or data indexing operations 148, and so on.

Metadata management operations 142 may involve one or more processes for maintaining up-to-date records of metadata contained in the data warehouse. Having up-to-records of metadata may be important for ensuring that the metadata actually reflects the data contained in the data lake.

ACID transaction management operations 144 may include several functions related to individualized transactions within the data lake. In one example, new transactions identified by a unique identifier and tied to their respective project and location can be created. The unique identifiers can then be used to define a transaction scope, such that a read operation can be executed within a specified transaction scope. Other example operations include transaction commitment and transaction rollback.

Data versioning operations 146 may involve the ability to track and revert to previous versions of data contained in the data lake. This may be useful for recovering from errors, restoring data to a previous state, or conducting operations on a consistent collection of data even when the current data in the data lake is changing.

Data caching and data indexing operations 148 may accelerate query processing in some cases. In some examples, the caching may provide a file listing. In other examples, column-level caching may be provided.

At least some of the operations included in the instructions 124 may improve governance and security of the data contained in the data lake. In particular, by providing the most up-to-date possible metadata, a more accurate snapshot of the data lake can be obtained, increasing the trustworthiness of governance and security operations, as well as auditing operations, ACID transaction management, indexing and caching operations, data versioning operations, data analysis tools, and so on. In the case of data analysis tools, it should be appreciated that such tools may include at least one row-level security tool, at least one column-level security tool, or both.

The computing devices 100 may also include additional components, such as a display (e.g., a monitor having a screen, a touch-screen, a projector, a television, or other device that is operable to display information) that provides a user interface that allows for controlling the computing devices 100. Such control may include for example using a computing device to cause data to be uploaded through input/output system 150 for processing, cause accumulation of data in storage, or more generally, manage different aspects of the system. While the input/output system 150 may be used to upload data, e.g., a USB port, receive commands and/or data, e.g., commands from a mouse, keyboard, touchscreen or microphone, or both.

The network connected to the computing devices 100 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc. and various combinations of the foregoing. Such communication may be facilitated by any device capable of transmitting data to and from other computing devices, such as modems and wireless interfaces. Computing device interfaces with the network through a communication interface, which may include the hardware, drivers and software necessary to support a given communications protocol.

Figure 2:
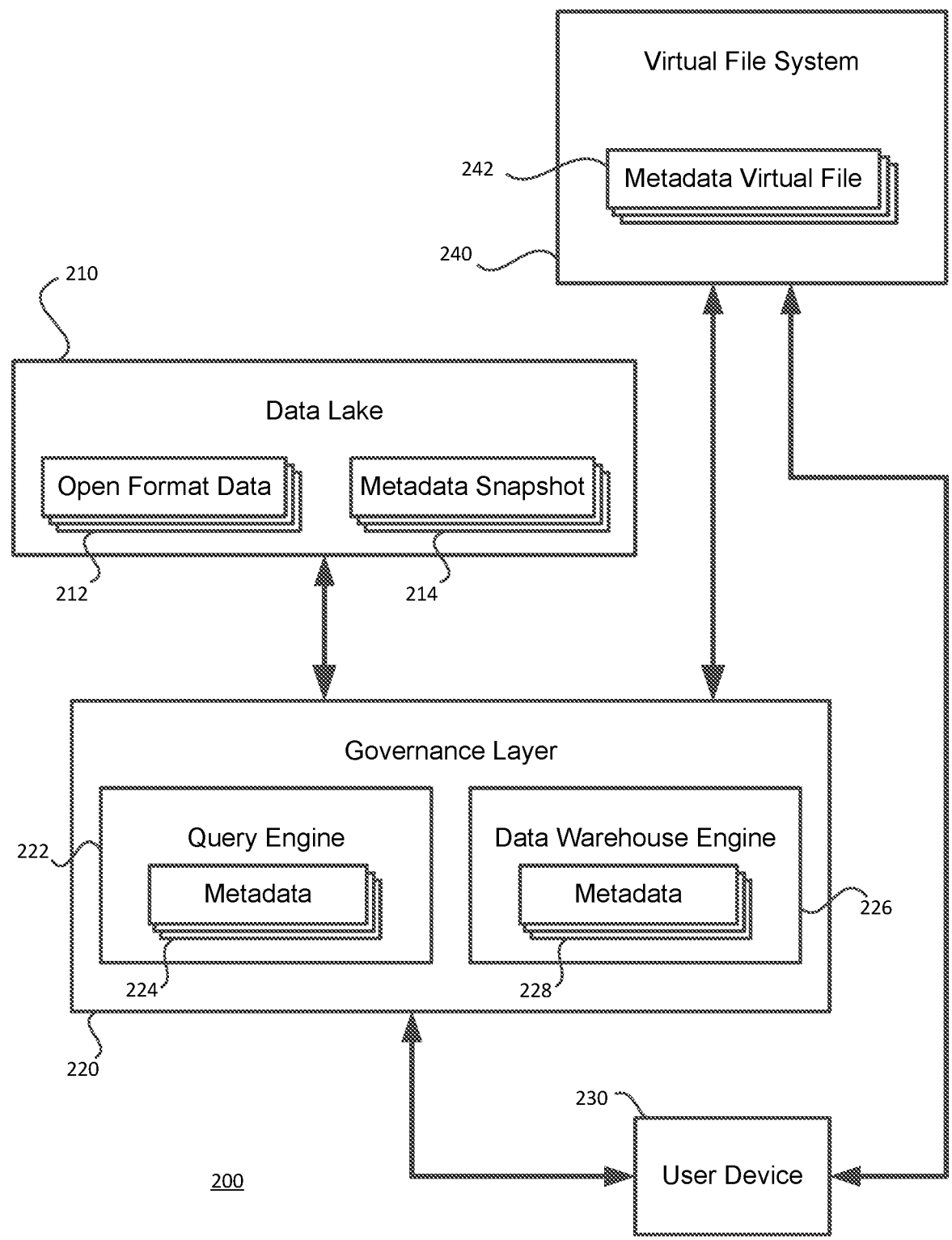

FIG. 2 is a block diagram illustrating one example arrangement of a metadata management system, such as the system of claim 1, among a plurality of computing devices. In the example of FIG. 2, the system 200 is shown to include a data lake 210 containing data 212, a governance layer 220 positioned between users of the data lake 210 (represented by user device 230) and the data lake 210, and a virtual file system 240 containing one or more virtual files 242.

With respect to the data lake 210, the data contained therein may be structured, unstructured, semi-structured, or any combination thereof. In the example of FIG. 2, the data is shown as being open format data 212, such as in an open table format as is typically found in data lakes. The data lake may further snapshots of metadata 214 which may be received from the governance layer.

The governance layer 220 may include any one or combination of services that store a catalog of metadata associated with the data contained in the data lake 210. One example service may be a query engine 222 that accesses the metadata 224 collected from the data lake in order to process incoming queries, such as from the user device 230. Another example service may be a data warehouse engine 226 that manages data from the data lake 210 according to the metadata 228. Each service may maintain its own respective set of the metadata, which may potentially cause further consistency issues if the metadata accessed from each service is not as up-to-date as possible.

The virtual file system 240 is provided as an additional layer between the user and the governance layer. Since snapshots of metadata pushed from the governance layer to storage in the data lake may not be up to date at any given moment that the user device 230 sends a request, the virtual file system 240 pulls a most up-to-date version of the metadata from the governance layer 220 in the form of a virtual file and serves this most-up-to-date version to the user device 230. This is shown in FIG. 2 as metadata virtual file 242. The virtual files may be generated in either or both of a row-based format, such as AVRO, or a column-based format, such as Arrow.

In one implementation, the metadata virtual file may be a manifest file derived from one or more snapshots of the data. In some cases, metadata in the snapshots may be organized efficiently, making the manifest files a convenient way of serving users with up-to-date metadata tables. Manifest files are also known to facilitate transaction consistency among multiple applications or services, time-based change tracking as well as the ability to query historical data, data rollback to prior versions of the data, and in some cases filtering or enhanced processing techniques to increase processing efficiency. Additionally, the manifest files may support both row-based format and column-based format data.

The some implementations of the example system 200 of FIG. 2, the system may be arranged as a lakehouse, which is a combination of both a data lake and a data warehouse, whereby the data lake functions as the lake component of the lakehouse, and the governance layer services operate as the data warehouse component of the lakehouse.

Example Methods

Figure 3:
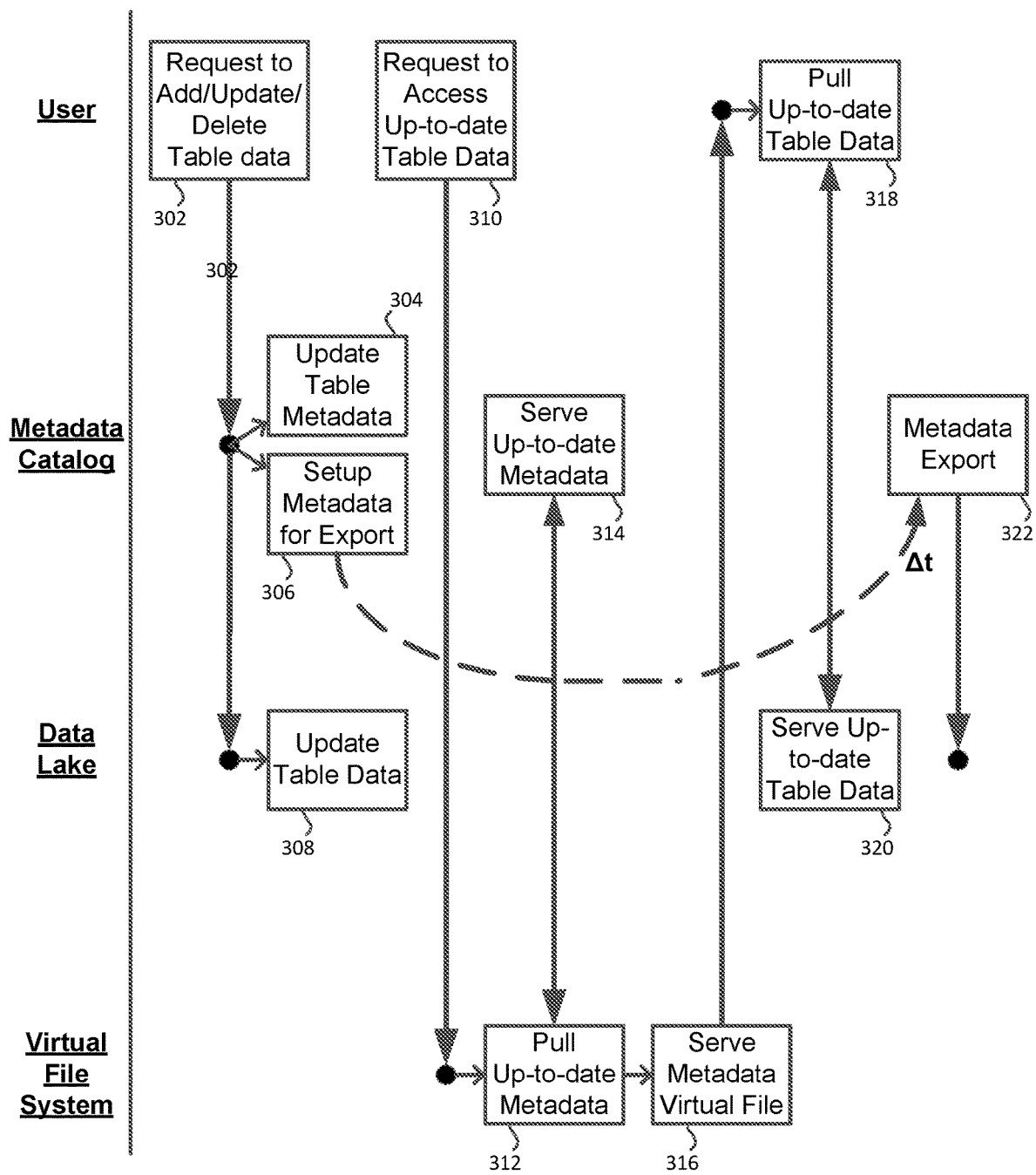
FIG. 3 is a flow diagram of an example data flow in accordance with an aspect of the present disclosure.

FIG. 3 is a flow diagram illustrating an example process 300 for managing metadata from a data lake, such as in the example systems of FIGS. 1 and 2. FIG. 3 illustrates various operations performed at each of a user device by a user, at a data lake storing the data that is updated or accessed by the user, a metadata catalog containing a table format of metadata of the data contained in the data lake, and a virtual file system for serving virtual files of the metadata from the data catalog. Although FIG. 3 illustrates only one user, one metadata catalog, one data lake and one virtual file system, it should be appreciated that the principles of the process 300 of FIG. 3 may be applied to a system having any one or combination of multiple users, multiple metadata catalogs, multiple data lakes and multiple virtual file systems using the same or similar underlying principles. For example, the underlying principles of FIG. 3 may apply to a circumstance where the same user that updates data in the data lake also requests to access that data at a later time, or to a circumstance where different users update the data lake and request access to the data at the later time.

At block 302, a user device transmits a first request from a user to both the data lake and the metadata catalog, whereby the first request from the user is received by both the data lake and the metadata catalog. The first request may indicate that table data in the data lake has been updated, such as data being added, data being deleted, or data being otherwise modified.

At block 304, in response to receiving the first request, table metadata contained in the metadata catalog may be updated to reflect the changes at the data lake. In some examples, the changes may be identified with a unique identifier. Additionally or alternatively, the changes may be associated with details, such as a time, a project, a location, and so on.

At block 306, the updated data in the metadata catalog may be set up for export to the data lake. For example, metadata reflecting recent updates and changes to the data may be collected in a snapshot, and the snapshot may be stored as a file in the data lake. Instead of every change being sent to the data lake separately, the snapshot may be a collection of several updates and changes over a duration of time, whereby after the duration of time passes, the collection of updates and changes may be pushed to the data lake. This duration of time is shown in FIG. 3 as Δt. Thus, the metadata snapshot collected and pushed after Δt may be a point in time snapshot of the data, particularly at the point in time at the end of the Δt duration. Since the duration Δt is not instantaneous, there is an amount of time for which the metadata snapshots stored in the data lake are not actually indicative of the most up-to-date data present.

At block 308, in response to receiving the first request, the table data in the data lake is updated based on the first request. As noted herein, the table data of the data lake may be structured data, unstructured data, or semi-structured data, or any combination thereof. The table data stored therein may be in an open format.

At block 310, a second user request may be issued from a user, which may be the same user from which the first request originated, or may be a different user. The second user request may identify data contained in the data lake to be accessed, such as by the unique identifier, project, location, time or time range, and so on. The second request may be a request to read or to modify the data. Initially, the second request may be transmitted to the virtual file system instead of directly to the metadata catalog or the data lake.

At block 312, the virtual file system may receive the second request and, in response to the second request, may initiate retrieval of up-to-date metadata from the metadata catalog without waiting for metadata snapshots to be pushed to the data lake. Retrieval may involve a request transmitted to the metadata catalog to pull the up-to-date metadata from the metadata catalog. In response, at block 314, the metadata catalog may serve the up-to-date metadata to the virtual file system. The served metadata may be similar to the snapshot of metadata typically pushed to the data lake, except that in this case it is pulled on-demand from the catalog by the virtual file system.

At block 316, in response to receiving the up-to-date metadata from the metadata catalog, the virtual file system may serve a virtual file to the user. Serving the virtual file may involve providing a path to the virtual file within the virtual file system. The virtual file may serve as a layer of abstraction for the data contained in the data lake, and may be utilized in the subsequent blocks to access the requested data from the data lake.

At block 318, once the user has access to the virtual file, the data contained in the virtual file may be used to pull the most up-to-date table data from the data lake. This may involve the user transmitting a further request for the up-to-date table data, but this time to the data lake instead of to the virtual file system, and using the virtual file data to ensure that the data being accessed in the data lake is indeed the most up-to-date available data. At block 320, the data lake may receive the user request and may serve the requested data, which is the most up-to-date version of the requested data.

Separate and apart from the second request from the user, at block 322, the metadata may be exported from the metadata catalog to the data lake. As noted above, this may occur after a duration Δt, whereby the second request may happen before or after the passage of the Δt duration of time. In this sense, regardless of whether the metadata has been exported to the data lake or not, the user can be certain that accessed data from the data is indeed up-to-date.

The example of FIG. 3 shows both a virtual file system accessing metadata from the metadata catalog and separately a data lake storing the metadata from the metadata catalog. Optionally, in other systems and processes, it may be possible to forgo the metadata snapshots being pushed from the metadata catalog to the data lake. For example, all metadata may be accessed through the virtual file system and metadata catalog. For further example, the metadata may be pushed from the metadata catalog to the data lake at those times that the data is requested to be accessed instead of at regularly scheduled intervals.

While the examples of the present disclosure are described in the context of accessing data lake information, it should be appreciated that the underlying concepts and principles may be applied to other data storage architectures, such as other data repositories for which metadata is warehoused and then accessed. In this sense, the data lake of the present disclosure can be understood more generally as a data repository. Furthermore, the lakehouse architecture of the present disclosure can be understood more generally as a storage architecture including a data repository layer and corresponding metadata layer through which access requests to the data layer are passed.

Overall, the present disclosure provides an advancement for data lakes that increases the ability to provide security and governance for the data contained therein, as well as facilitating ACID transactions, data versioning, auditing, indexing, caching, and statistical analysis. Additionally, because the present disclosure relies on virtual files to facilitate these advancements, the improvements are easily compatible for existing data lake storage formats and both current and future open source data tools.

The example systems and methods of the present disclosure demonstrate how multiple data elements can be moved from a common row of a source matrix to a common column of a transposed result matrix in the same cycle of a transpose operation without having to increase the transpose unit logic circuitry by a factor of two or more. This has the advantage of conserving cost and space in the system without sacrificing at speed processing capability. Ultimately, the resulting transpose processing can keep pace with other functions performed by the same system, such as matrix multiplication functions in the case of a neural network accelerator, other accelerator system or chip, or other system requiring matrix transpose functionality.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing metadata in a data lakehouse, the data lakehouse including each of a data lake layer and a data warehouse layer, the method comprising:
   receiving, by one or more processors, a data change to data in a data repository of the data lake layer, wherein the data repository is configured to store a combination of structured, semi-structured and unstructured data in a repository layer, and store metadata of the data in the data repository in a metadata layer of the data repository;
   updating, by the one or more processors, a metadata catalog included in the data warehouse layer to reflect the data change, wherein the metadata catalog includes a structured format of the metadata of the data in the data repository;
   receiving, by the one or more processors, a user request to access requested data stored in the repository layer of the data repository of the data lake layer, wherein the requested data is associated with metadata of the data change; and
   transmitting, by the one or more processors, a request to the metadata catalog for the metadata of the data change;
   receiving, by the one or more processors, the metadata of the data change from the metadata catalog; and
   transmitting, by the one or more processors, a virtual file containing the received metadata of the data change, wherein the virtual file is in a data storage format that is compatible with one or more data analysis tools.

2. The method of claim 1, wherein the data storage format of the virtual file is an open table format.

3. The method of claim 1, further comprising:
   generating, by the one or more processors, a snapshot of the metadata of the data change; and
   storing the snapshot in a network-connected storage medium separate from the data repository, wherein storing the snapshot occurs either in response to a user storage request or at regularly scheduled intervals.

4. The method of claim 3, wherein the metadata stored in the metadata catalog of the data warehouse layer is accessible via the user request prior to generating the snapshot of the metadata.

5. The method of claim 1, wherein the one or more data analysis tools includes at least one of a governance compliance tool, a data versioning tool, or a file listing caching tool.

6. The method of claim 1, further comprising storing, by the one or more processors, the virtual file in a data store containing a plurality of virtual files containing metadata from the data repository.

7. The method of claim 6, wherein the plurality of virtual files include at least one virtual file in a row-based format and at least one virtual file in a column-based format, and wherein the one or more data analysis tools includes at least one row-level security tool and at least one column-level security tool.

8. The method of claim 1, wherein the data change to data in the data repository is an ACID transaction.

9. A system for managing metadata in a data lakehouse, the data lakehouse including each of a data lake layer and a data warehouse layer, the system comprising:
   one or more processors; and
   memory having stored thereon instructions for causing the one or more processors to:
   receive a data change to data in a data repository of the data lake layer, wherein the data repository is configured to store a combination of structured, semi-structured and unstructured data in a repository layer and store metadata of the data in the data repository in a metadata layer of the data repository;
   update a metadata catalog included in the data warehouse layer to reflect the data change, wherein the metadata catalog includes a structured format of metadata of the data in the data repository;
   receive a user request to access requested data stored in the repository layer of the data repository of the data lake layer, wherein the requested data is associated with metadata of the data change;
   transmit a request to the metadata catalog for the metadata of the data change;
   receive the metadata of the data change from the metadata catalog; and
   transmit a virtual file containing the received metadata of the data change, wherein the virtual file is in a data storage format that is compatible with one or more data analysis tools.

10. The system of claim 9, wherein the memory includes a data lake containing both structured data and unstructured data in an open table format.

11. The system of claim 10, wherein the instructions further cause the one or more processors to:
generate a snapshot of the metadata contained in the data warehouse; and
push the snapshot to storage in response to a user storage request or at regularly scheduled intervals.

12. The system of claim 10, wherein the metadata stored in the metadata catalog of the data warehouse layer is accessible via the user request prior to a snapshot of the metadata being generated.

13. The system of claim 10, wherein the one or more virtual files include at least one virtual file in a row-based format and at least one virtual file in a column-based format, and wherein the one or more data analysis tools includes at least one row-level security tool and at least one column-level security tool.

14. The system of claim 9, wherein the one or more data analysis tools includes at least one of a governance compliance tool, a data versioning tool, or a file listing caching tool.

15. The system of claim 9, wherein the data change to data in the data repository is an ACID transaction.

* * * * *